Nov. 13, 1956  O. W. BONNAFE  2,770,027
BROACH WITH MULTIPLE CUTTING PLATES
Filed Feb. 14, 1955  2 Sheets-Sheet 2
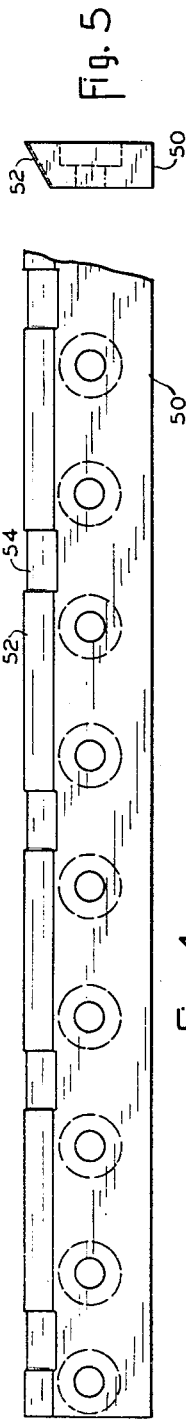
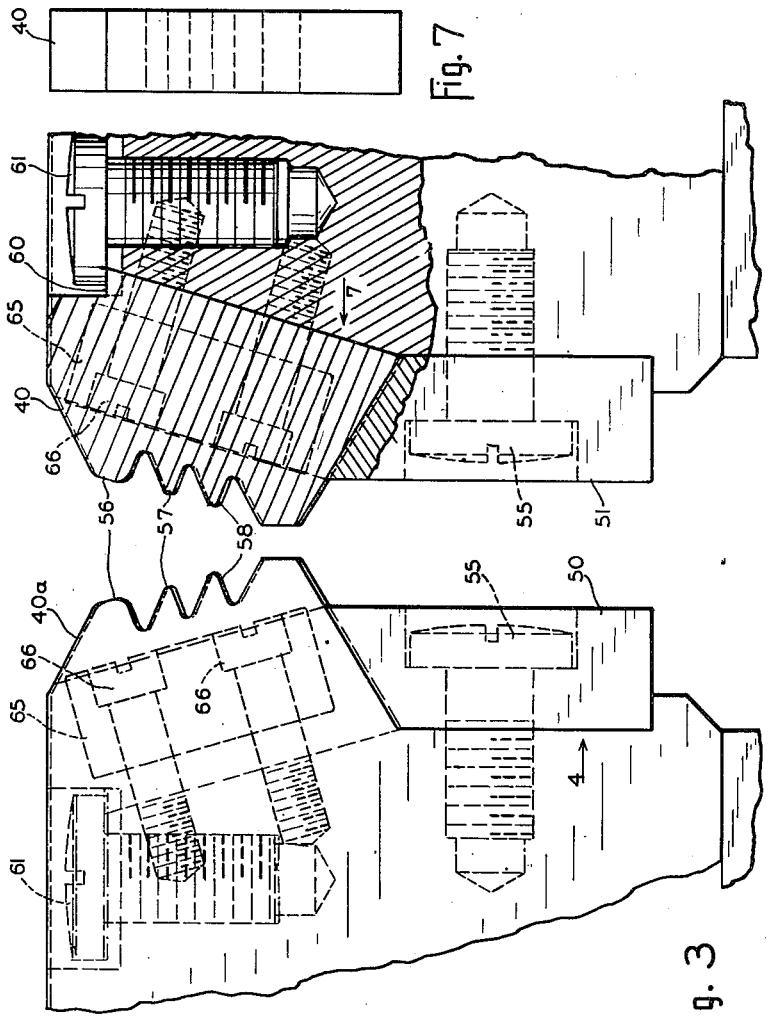
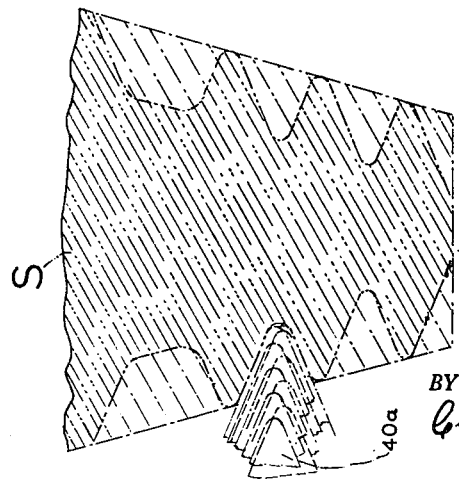
INVENTOR.
OLIVER W. BONNAFE.
BY Chas. T. Hawley
ATT'Y.

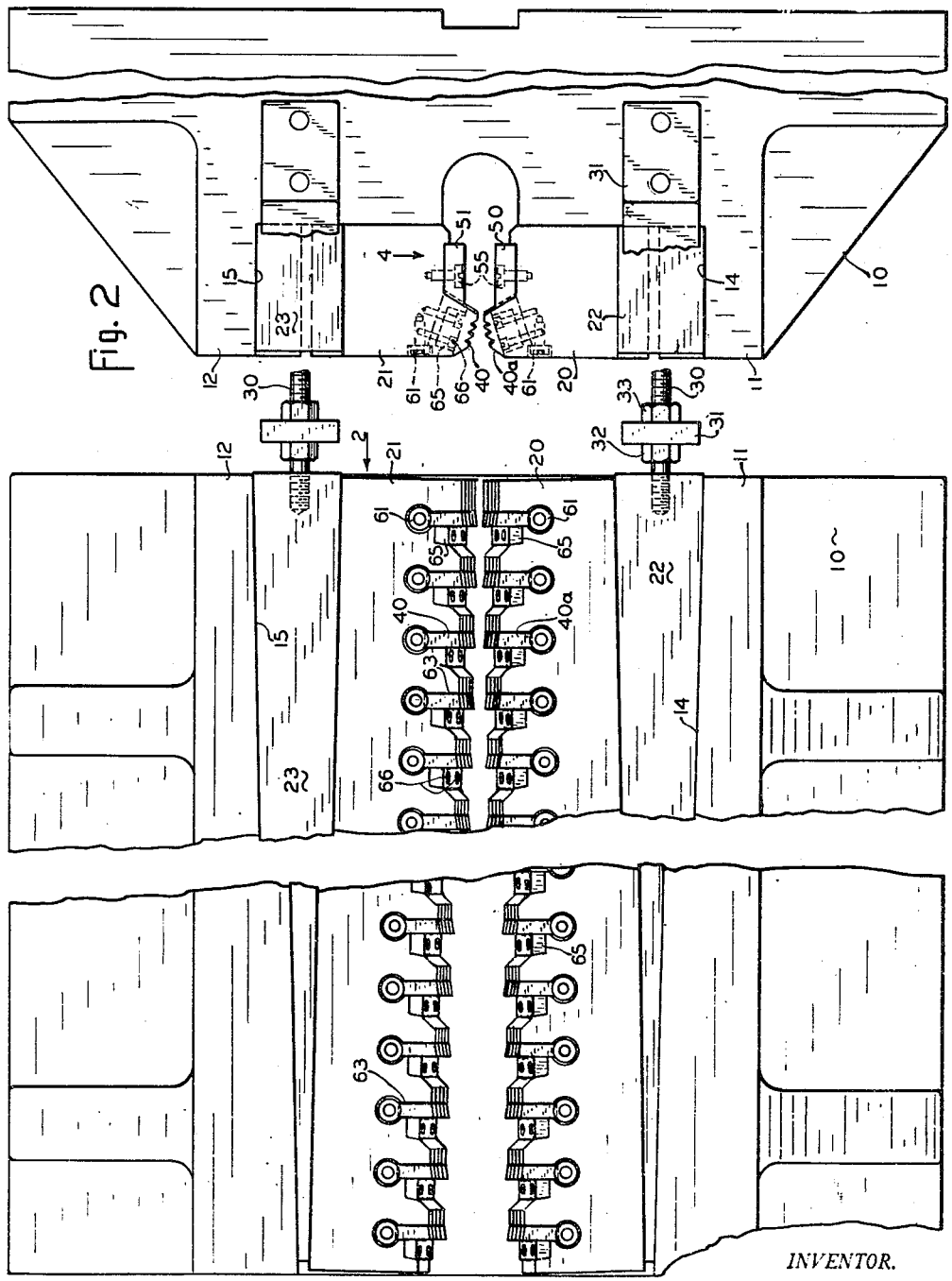

United States Patent Office 2,770,027
Patented Nov. 13, 1956

2,770,027
BROACH WITH MULTIPLE CUTTING PLATES

Oliver W. Bonnafe, Hudson, Mass., assignor to The Lapointe Machine Tool Company, Hudson, Mass., a corporation of Maine Application February 14, 1955, Serial No. 487,811

2 Claims. (Cl. 29—95.1)

This invention relates to a broach particularly designed for cutting very tough and strong metals such as cobalt steel. Such metals require cutting tools of carbide-type steel for effective machining and such steel is highly expensive.

It is the general object of this invention to provide a broach in which carbide-type steel may be used in the form of relatively thin, flat plates mounted to provide a substantial series of cutting units extending lengthwise of the broach.

A broach is also provided in which successive cutting units each remove a small portion only of the tough metal, and whereby the strain on each cutting unit is much reduced. A further feature of the invention is the provision of a broach using a plurality of flat cutting units which are identical in size and shape, except as ground for clearance.

My invention further relates to arrangements and combinations of parts which will be hereinafter described and more particularly pointed out in the appended claims.

A preferred form of the invention is shown in the drawings, in which

Fig. 1 is a partial plan view of my improved broach;

Fig. 2 is an end elevation, looking in the direction of the arrow 2 in Fig. 1;

Fig. 3 is an enlarged detail end elevation, partly in section;

Fig. 4 is a side elevation of a supporting bar, looking in the direction of the arrow 4 in Fig. 2;

Fig. 5 is an end view of the bar shown in Fig. 4;

Fig. 6 is an enlarged sectional elevation showing the operation of successive cutting units; and Fig. 7 is an edge view of a cutting unit.

Referring to the drawings, my improved broach comprises a base 10 having side flanges 11 and 12 which are provided with inclined or tapered inner faces 14 and 15. Cutter supports 20 and 21 (Fig. 2) are mounted in the base 10 and are spaced from the flanges 11 and 12 by wedge-bars 22 and 23. When the tapered bars 22 and 23 are moved endwise, they coact with the tapered side flanges 11 and 12 to force the supporting members 20 and 21 toward each other with a differential adjusting effect.

Suitable means is provided for moving the bars 22 and 23 endwise. As shown in Fig. 1, such adjusting means may comprise studs 30 fixed in the ends of the bars 22 and 23 and extending through brackets 31 mounted on the end of the base 10. Nuts 32 and 33 are provided for moving the bars 22 and 23 endwise and for securing them in adjusted position.

A substantial number of cutting units 40 and 40a are provided, which units are all identical, except for being oppositely ground for cutting clearance.

Each unit 40 or 40a comprises a relatively small and thin plate of carbide-type steel, the outline of which is clearly shown in Fig. 3. The cutting units 40 and 40a are vertically assembled on supporting bars 50 and 51, each of which bars has an inclined upper edge surface 52 provided with a series of portions 54 which are depressed very slightly below the surface 52. These bars 50 and 51 are secured in the supporting members 20 and 21 by clamping screws 55.

Each cutting unit 40 or 40a has one edge formed with successive cutting teeth as 56, 57 and 58, corresponding in general to the cross section of the turbine blade shank S (Fig. 6) which is of the usual so-called "Christmas-tree" section. Each cutting unit 40 or 40a is also provided with a shoulder 60 on its back edge which is adapted to be engaged by the head of a clamping screw 61 by which it is firmly seated against its supporting bar 50 or 51.

Each alternate cutting unit 40 or 41 is seated in one of the depressed portions 54 and its cutting edge is thus slightly below the cutting edges of the next adjacent cutting units which are supported on the beveled surface 52.

The bars 20 and 21 are transversely slotted as indicated at 63 (Fig. 1) to receive successive plates or cutting units 40 or 40a, and suitable provision is made for applying clamping pressure against one side face of each cutting unit. Such side pressure is applied to each plate by a wedge-shaped clamping bar 65 and screws 66 (Fig. 3).

With the cutting units 40 or 40a thus alternately disposed in slightly raised and slightly depressed positions, the cutting units operate as indicated at the left in Fig. 6, with one unit making a thin cut at the upper edge of each groove in the work S, and the next unit making a corresponding thin cut at the bottom or lower part of the grooves.

At the same time, the tapered setting of the supporting members 20 and 21, as determined by the tapered flanges 11 and 12 and the tapered wedges 22 and 23, causes the cutters to be positioned progressively nearer the center line of the work and thus to cut the grooves progressively deeper.

The entire depth of cut is thus produced by a multiplicity of successive partial and thin cuts, and with each cut removing a relatively small amount of metal only.

It has been previously pointed out that all of the cutting units 40 and 40a are identical, except as ground for clearance, and that all of the cutting units of each series are identical throughout the length of the broach and are similarly mounted in their supporting bars.

Having thus described my invention and the advantages thereof, I do not wish to be limited to the details herein disclosed, otherwise than as set forth in the claims, but what I claim is:

1. In a broach, a plurality of identical cutting units, holding bars transversely slotted to receive said cutting units, a supporting bar for said units having alternate raised and depressed top surface portions which support alternate cutting units of identical cross section in correspondingly raised and depressed relative positions, the top surface of the supporting bar being downwardly and backwardly inclined away from the cutting edges of said cutting units, and each cutting unit having a coacting inclined bottom edge surface, and means to firmly seat each cutting unit on the downwardly and backwardly inclined top surface of said supporting bar.

2. The combination in a broach as set forth in claim 1, in which wedge-shaped means is also provided to clamp each cutting unit against one side wall of the slot in which said unit is seated.

References Cited in the file of this patent
UNITED STATES PATENTS 45,187    Spaulding _____ Nov. 22, 1864

(Other references on following page)

UNITED STATES PATENTS

| | | |
|---|---|---|
| 108,943 | Smith | Nov. 1, 1870 |
| 446,074 | Myers | Feb. 10, 1891 |
| 1,045,984 | King | Dec. 3, 1911 |
| 1,254,589 | Forsman | Jan. 22, 1918 |
| 1,411,390 | Tibbetts | Apr. 4, 1922 |
| 1,440,933 | Perkins | Jan. 2, 1923 |
| 1,776,711 | Unger | Sept. 23, 1930 |
| 1,978,458 | Halborg | Oct. 30, 1934 |
| 2,101,624 | Muller | Dec. 7, 1937 |
| 2,173,074 | Romaine | Sept. 12, 1939 |
| 2,240,444 | Reaney | Apr. 29, 1941 |
| 2,656,590 | Hooper | Oct. 27, 1953 |

FOREIGN PATENTS

| | | |
|---|---|---|
| 13,035 | Great Britain | 1850 |
| 658,460 | Great Britain | Oct. 10, 1950 |